United States Patent [19]

Schwarzer et al.

[11] 4,244,153
[45] Jan. 13, 1981

[54] EARTH COVERED IN-THE-GROUND NUCLEAR REACTOR FACILITY

[75] Inventors: Klemens Schwarzer, Jülich; Wolfgang Kröger, Alsdorf; Karl-Heinz Escherich, Eschweiler; Klaus Kasper, Alsdorf; Jürgen Altes, Aachen, all of Fed. Rep. of Germany

[73] Assignee: Kernforschungsanlage Jülich, Gesellschaft mit beschränkter Haftung, Jülich, Fed. Rep. of Germany

[21] Appl. No.: 890,261

[22] Filed: Mar. 27, 1978

[30] Foreign Application Priority Data

Mar. 29, 1977 [DE] Fed. Rep. of Germany ....... 2713824

[51] Int. Cl.³ ............................................. E02D 27/00
[52] U.S. Cl. .................................. 52/169.5; 52/169.6; 176/87; 176/DIG. 2
[58] Field of Search ...................... 176/38, DIG. 2, 87; 52/169.5, 169.6, 169.14

[56] References Cited

U.S. PATENT DOCUMENTS

| | | | |
|---|---|---|---|
| 2,277,286 | 3/1942 | Bechtner | 52/169.14 X |
| 3,021,273 | 2/1962 | Dix | 176/DIG. 2 |
| 3,258,403 | 6/1966 | Malay | 176/DIG. 2 |
| 3,712,851 | 1/1973 | Isberg et al. | 176/87 X |
| 4,151,689 | 5/1979 | Schabert | 52/169.6 X |

OTHER PUBLICATIONS

Underground Siting of Nuclear Power Reactors, V. N. Karpenko & C. E. Walter, Oct. 25, 1974, 21 pages, a paper prepared for submittal to Proceedings IAEA/NEA Symposium on the siting of Nuclear facilities, Vienna, Austria, Dec. 9-13, 1974.

*Primary Examiner*—Alfred C. Perham
*Attorney, Agent, or Firm*—Frishauf, Holtz, Goodman & Woodward

[57] ABSTRACT

A clay layer of low permeability and of a thickness of about 2 meters, depending somewhat upon the permeability, immediately covers and laterally surrounds the external concrete wall and roof structure of the nuclear reactor building, this layer extending at least down to a ground water draining or leading ground layer. Above it is a layer of gravel, sand or porous stone of relatively high permeability, typically somewhat less than a meter thick, and on top thereof an earth fill layer of less permeability than the intermediate layer is provided, which is typically 8 meters thick. The clay layer, which could also be a loam layer, prevents the emergence of radioactive materials in the event of cracking of the concrete structure by an accidental malfunction and absorbs aerosols and water-soluble fission products. The gravel layer converts the convective mass flow of the emerging materials into a diffusion flow and prevents the spreading of cracks in the covering layers. In the thick earth fill layer on top, any radioactive materials still spreading are transported only by a process of diffusion. If protection is to be provided against the strongest external effects, a concrete paving can be put on top of the earth fill.

3 Claims, 3 Drawing Figures

EARTH COVERED IN-THE-GROUND NUCLEAR REACTOR FACILITY

This invention concerns a nuclear reactor facility of the underground type of construction in which at least a part of the building of the nuclear facility, particularly the building portion containing the reactor, is embedded in undistrubed ground and an outer concrete wall and roof structure projecting above the top edge of the surrounding natural landscape is covered with earth fill, spread thereover.

The underground type of structure for nuclear reactor facilities is sought to be used for safety reasons. The possible gain in safety margin is to be weighed against the additional costs for the emplacement of a nuclear reactor facility of that type. It is known to locate reactor facilities in rock caverns. This has been done heretofore, however, only for nuclear reactor facilities of relatively low power (cf. "Review on Underground Siting of Nuclear Power Plants", UEC-AEC 740 107, 1974).

Rock caverns for nuclear reactor facilities of higher power are generally not available in most landscape regions. Constructions embedding the facility in the ground are therefore recommended. It is disclosed in a publication of W. Kröger et al., "Unterirdische Bauweise von Kernkraftwerken" in the 1975 Annual Report of the Kernforschungsanlage Jülich GmbH, that in the case of a nuclear reactor facility, half or entirely sunk into the ground, safety of the external concrete walls of the building of the facility was increased by overlaying them with up to 10 meters of earth and, for the protection against the strongest external effects, up to 20 meters of earth.

Additional precautions are, however, to be considered in the design, particularly in the design of the portion of the building containing the reactor, if in the case of so-called hypothetical disturbance cases, that go beyond the greatest accident to be postulated, sufficient products penetrate into the inner chamber of the reactor building, and a crack formation in the outer concrete wall structure from the disturbance accident must be taken into account, such that radioactive fission products can get into the environment of the reactor facility.

It is an object of the invention to provide such precautions in the underground type of construction for nuclear reactor facilities, that in spite of the formation of cracks that might occur in one of the external concrete wall or roof members of the underground building of the nuclear reactor facility in the case of a hypothetical malfunction resulting from the giving-off of fission products, no contamination of the environment of the nuclear reactor facility will take place.

SUMMARY OF THE INVENTION

Briefly, the external concrete wall and roof structure projecting above the natural landscape is surrounded and covered by a first layer of clay and/or loam extending at least down to a ground-water-diverting ground layer a second layer of greater permeability consisting of gravel, sand, porous stones or the like is provided above the first layer, and a top layer of earth fill that is at least 3 meters thick and has a permeability less than that of the second layer is then spread over the latter. In the case of a malfunction accident, the emergence of radioactive materials from the outer concrete structure is strongly reduced and aerosols and water-soluble fission products are held back by the clay and/or loam layer surrounding the concrete structure because of the low permeability, between 0.001 and 0.1 darcy (1 darcy $\triangleq$ 0.987×10$^{-8}$ cm$^2$) of the clay and/or loam layer. Most advantageously, this layer has a thickness from about 1.5 to a maximum of 3 meters. It extends down to the ground water draining ground layer and thus prevents the contamination of ground water. In the layer next upward from the clay and/or loam layer that consists of gravel, sand or porous stones such as slags or porous building material as well as crushed stone, or can also be provided, for example, of glass fiber material, and has a layer permeability between 1 and about 100 darcy and a height from about 0.5 to a maximum of 1 meter, the convective mass flow of the emerging materials is converted into a diffusion flow, so that the radioactive materials that manage to penetrate through the clay and/or loam layer into the overlying earth fill layer, that has a permeability between 0.01 and 1 darcy, reach the overlying layer only by diffusion at the surface. As a result of the long diffusion times thereby resulting, the radioactive materials relevant for radioactive contamination are largely decomposed already within the earth fill covering.

In order to provide protection also against contamination of the deeper-lying ground layers with radioactive fission products in the case of crack formation in the external concrete walls, particularly if at the location of the nuclear facility it is necessary to contend with ground water velocity greater than 10 meters per day, or if a ground layer is present that has a small adsorption capacity for water-soluble fission products, a further development of the invention is provided whereby the clay and/or loam layer surrounds the outer concrete structure down to the floor plate of the reactor-containing building portion. It is particularly effective for the clay and/or loam layer to fill an intermediate space between outer concrete wall structures and reinforced excavation cavity walls.

The invention is further described by way of illustrative example, with reference to the annexed drawings, in which.

Figure 1:
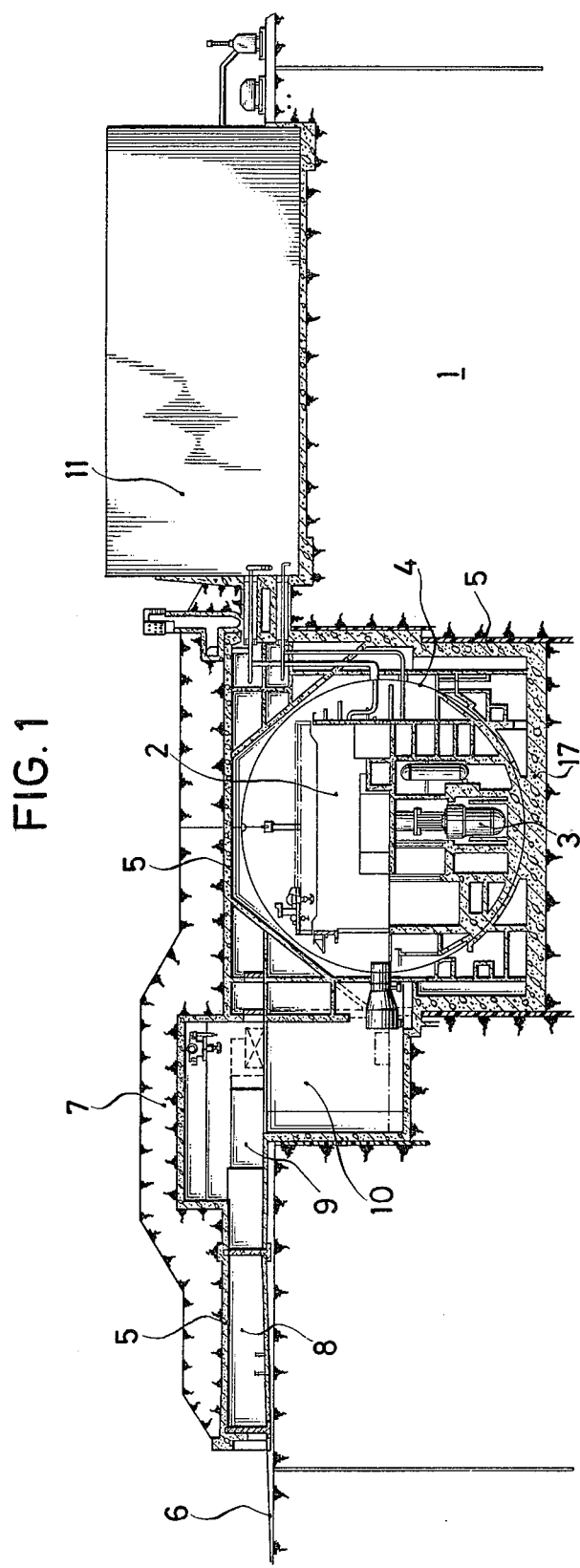
FIG. 1 is a diagrammatic cross-section of an underground nuclear reactor facility.

As can be seen from the drawing, the reactor facility is completed embedded in undisturbed ground 1. In the reactor building 2, there are housed a nuclear reactor 3 with a primary cooling loop within a safety container 4. The outer concrete wall and roof structure 5 of the reactor building 2 that projects above the top edge 6 of the natural landscape contour is covered by an earth layer 7. Alongside the reactor building 2, still other building portions belonging to the nuclear reactor facility are located that are covered by earth fill along with the reactor building portion 2, FIG. 1 showing an input passage 8 and a sluice 9,10 among the ancillary building portions of the installation. The fill covering 7 extends all the way to the machinery building 11 in which the equipment for energy conversion is located.

Figure 2:
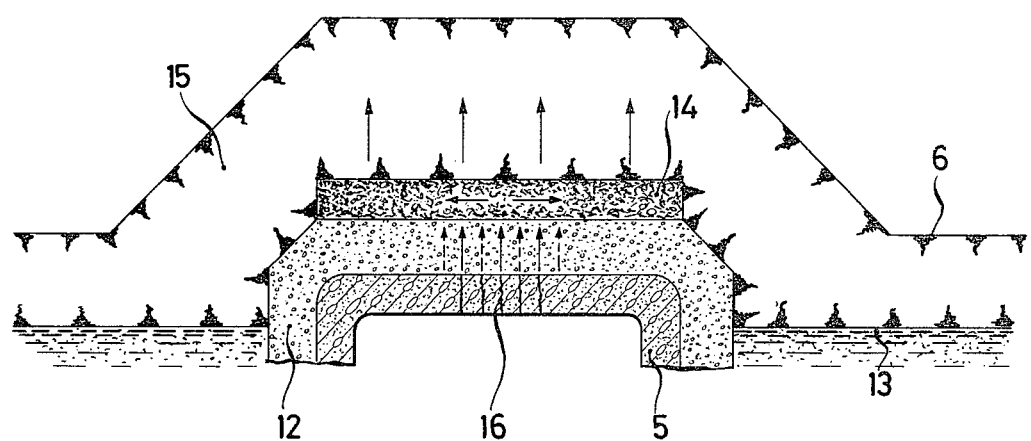
FIG. 2 is a basic diagram of the covering of the external concrete wall and roof structure of the facility.

As is shown in FIG. 2, the protective covering 7 of the external concrete wall and roof structure 5 consists, going from the inside to the outside, first of a clay layer 12 immediately surrounding the concrete wall and roof structure 5. The clay layer 12 is continued down to the ground-water-draining ground layer 13 and is 2 meters thick in the illustrated example. The height of the clay layer—as also the height of the other layers of the covering—is determined primarily in accordance with the permeability of the particular material utilized. In the illustrated example, a clay having a permeability of the order of magnitude of $10^{-3}$ darcy is illustrated. The clay layer 12 is covered by a layer 14 that is 0.7 meters thick and consists of gravel having a permeability of the order of 10 darcy. Finally, an earth fill layer 15, 8 meters thick, lies over the gravel layer 14 and consists of earth fill having a permeability of the order of magnitude of $10^{-1}$ darcy.

The clay layer 12 hinders the emergence of radioactive materials and absorbs aerosols and water-soluble fission products in the event of an assumed hypothetical malfunction accident accompanied by crack formation 16 in the outer concrete wall and roof structure 5. In the gravel layer 14, the convective mass flow of the emerging materials is interrupted and converted into a diffusion flow. The layer 14 also impedes the spread of cracks in the earth fill and thereby also an undesired breaking through of a crack all the way to the surface of the fill layer 15. In the earth layer 15, the radioactive materials that still occasionally penetrate the layers are transported further only as the result of diffusion. Convection flow and diffusion flow in the covering are indicated in FIG. 2 by various arrows.

The covering 7 shown in the illustrated example not only holds back the radioactive fission products emerging from the reactor facility in the case of hypothetical malfunction accidents accompanied by additional undermining crack formation in the outer concrete wall structure, but is also capable of absorbing other shock loads, for example in the case of impact from a falling aircraft. In order to provide also for protection against the strongest external effects, the earth fill layer 15 can be covered further by a shield paving of concrete.

Figure 3:
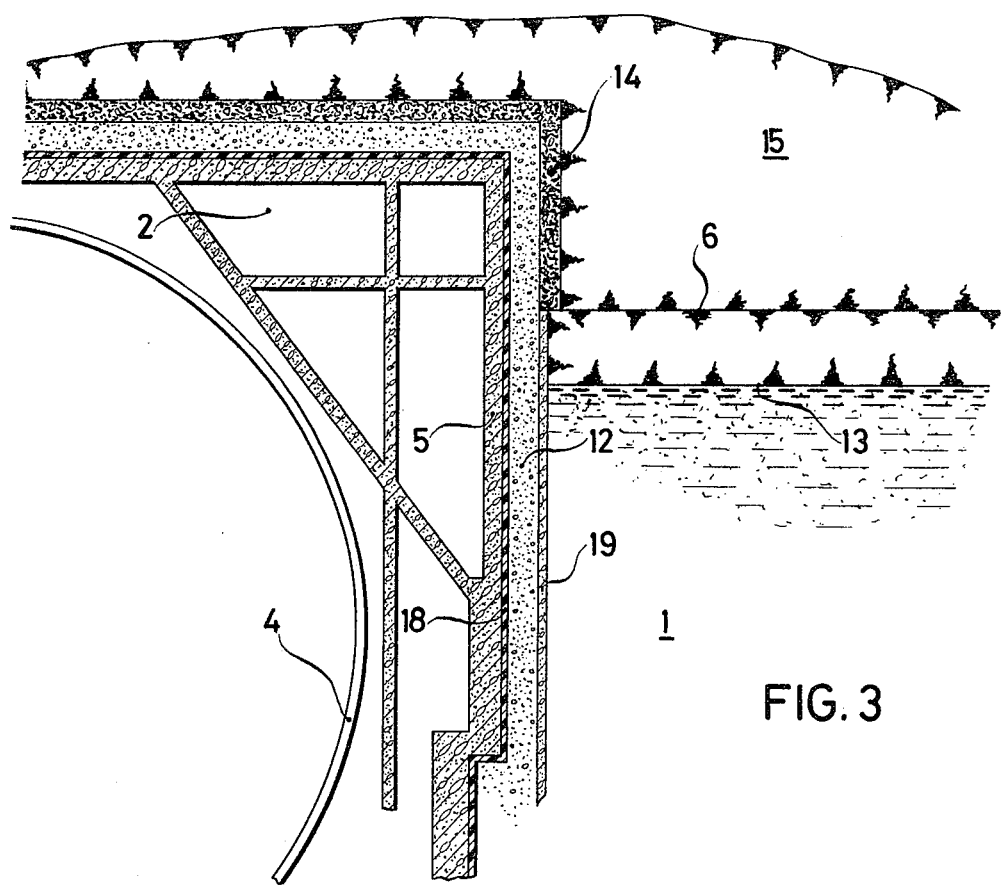
FIG. 3 is a partial cross-sectional view of the external concrete wall and roof structure of the nuclear reactor facility in the vicinity of a side of the excavation for the building.

FIG. 3 shows a partial cross-sectional view of the outer concrete wall and roof structure 5 in a form of construction provided for unfavorable ground qualities at the building site of the reactor installation. The clay layer 12 surrounds the outer concrete wall structure 5 down beyond the ground-water-draining ground layer 13 all the way to the level of the bottom plate 17 of the reactor building 2. The clay layer 12 fills an interval between the outer concrete wall structure 5 and its insulating layer 18 and a reinforced excavation retaining wall 19. The clay layer is 2 meters thick. The clay layer reaching all the way to the bottom concrete floor 17 is of particular importance where a ground water velocity of more than 10 meters per day is present and/or ground layers are present that have a low adsorption capability for water-soluble fission products.

Although the invention has been described with reference to a particular illustrative embodiment, it will be recognized that variations and modifications are possible within the inventive concept.

We claim:

1. An in-the-ground nuclear reactor facility having a part of the nuclear reactor facility building which includes the building portion containing the nuclear reactor embedded below the natural ground topography of the site, at least said part of said building having an external concrete wall and roof structure projecting above the top edge of the natural landscape surface and covered with fill extending down to the land surface, which facility comprises the improvement which consists in that:

said external concrete wall and roof structure (5) above the natural landscape surface top edge (6) is surrounded and covered by a first layer (12) adjacent to said wall and roof structure and composed of a material selected from the group consisting of clay, loam and mixtures of clay and loam having a permeability in the range from 0.001 to 0.1 darcy, said first layer extending at least down to a ground-water diverting ground layer and having a thickness in the range from 1.5 to 3 meters;

of the building portion embedded below the natural ground contour, at least the part which is below the top of said ground water diversion ground layer (13) is embedded substantially entirely in undisturbed ground except for the presence of any portion of said first layer extending downward from above;

above said first layer (12) is overlaid a second layer (14) of a permeability in the range from 1 to 100 darcy, of a material selected from the group consisting of gravel, sand, porous stones and the like and of a depth in the range between 0.5 3 meters, and above said second layer (14) is spread a top layer (15) of earth fill that is at least 3 meters thick and has a permeability less than that of said second layer (14).

2. A nuclear reactor facility as defined in claim 1, in which said first layer (12) surrounds said external concrete structure (5) down to the floor plate (17) of said reactor-containing building portion (2).

3. A nuclear reactor facility as defined in claim 2, in which reinforced building excavation walls (19) are provided laterally beyond and spaced from said external concrete structure and said second layer (12) fills in the intermediate space between said external concrete structure and said reinforced excavation walls (19).

* * * * *